(12) United States Patent
Orlandini et al.

(10) Patent No.: US 10,841,977 B2
(45) Date of Patent: Nov. 17, 2020

(54) RECONFIGURABLE RADIO REMOTE UNIT FOR DISTRIBUTED ANTENNA SYSTEMS

(71) Applicant: TEKO TELECOM S.R.L., Castel San Pietro Terme (IT)

(72) Inventors: Roberto Orlandini, Castel San Pietro Terme (IT); Gilberto Brizzi, Castel San Pietro Terme (IT); Massimo Notargiacomo, Castel San Pietro Terme (IT); Paolo Francia, Castel San Pietro Terme (IT); Isabella Liporesi, Castel San Pietro Terme (IT)

(73) Assignee: Teko Telecom S.r.l., Castel San Pietro Terme (IT)

( * ) Notice: Subject to any disclaimer, the term of this patent is extended or adjusted under 35 U.S.C. 154(b) by 0 days.

(21) Appl. No.: 16/474,272

(22) PCT Filed: Dec. 20, 2017

(86) PCT No.: PCT/IB2017/058207
§ 371 (c)(1),
(2) Date: Jun. 27, 2019

(87) PCT Pub. No.: WO2018/122690
PCT Pub. Date: Jul. 5, 2018

(65) Prior Publication Data
US 2020/0128623 A1 Apr. 23, 2020

(30) Foreign Application Priority Data
Dec. 27, 2016 (IT) .......................... 102016000131387

(51) Int. Cl.
*H04W 92/14* (2009.01)
*H04W 88/08* (2009.01)
(Continued)

(52) U.S. Cl.
CPC ......... *H04W 88/085* (2013.01); *H04W 12/06* (2013.01); *H04W 52/226* (2013.01); *H04W 52/346* (2013.01); *H04W 72/0453* (2013.01)

(58) Field of Classification Search
CPC ... H04W 52/367; H04W 64/00; H04W 12/06; H04W 24/02; H04W 24/04;
(Continued)

(56) References Cited

U.S. PATENT DOCUMENTS 9,794,795 B1* 10/2017 Kruh ..................... H04W 16/18
2012/0039254 A1* 2/2012 Stapleton .............. H03F 1/3247
370/328

(Continued)

FOREIGN PATENT DOCUMENTS

WO  2008/027213 A2  3/2008
WO  2009/021359 A1  2/2009
(Continued)

*Primary Examiner* — Tu X Nguyen
(74) *Attorney, Agent, or Firm* — David B. Tingey; Bryant J. Keller; Kirton McConkie

(57) ABSTRACT

The reconfigurable radio remote unit for distributed antenna systems comprises a plurality of integrated radio frequency boards each dedicated to a respective frequency band, and configuration means for remotely selecting the frequency bands and/or for setting the power level of the frequency bands.

16 Claims, 1 Drawing Sheet

(51) Int. Cl.
    *H04W 12/06*     (2009.01)
    *H04W 52/22*     (2009.01)
    *H04W 52/34*     (2009.01)
    *H04W 72/04*     (2009.01)

(58) Field of Classification Search
    CPC .. H04B 2203/5479; H04B 3/58; H04B 7/022; H04B 7/15557
    USPC ............................................. 455/419
    See application file for complete search history.

(56) References Cited

U.S. PATENT DOCUMENTS

| | | | |
|---|---|---|---|
| 2012/0069880 A1* | 3/2012 | Lemson | H04B 1/18 375/220 |
| 2013/0195467 A1* | 8/2013 | Schmid | H04B 1/0096 398/115 |
| 2014/0146692 A1* | 5/2014 | Hazani | H04L 43/00 370/252 |

FOREIGN PATENT DOCUMENTS

| | | |
|---|---|---|
| WO | 2010/083115 A2 | 7/2010 |
| WO | 2010/133942 A1 | 11/2010 |
| WO | 2011/123314 A1 | 10/2011 |

* cited by examiner

RECONFIGURABLE RADIO REMOTE UNIT FOR DISTRIBUTED ANTENNA SYSTEMS

TECHNICAL FIELD

The present invention relates to a reconfigurable radio remote unit for distributed antenna systems.

BACKGROUND ART

A Distributed Antenna System, or DAS, is a network of spatially separated antenna nodes connected to a common source via a transport medium that provides wireless service within a geographic area or structure.

It is known that DAS Remote Units must be able to be reconfigured in the field. In order to provide this capability, conventional DAS Remote Units have hardware slots for different radio frequency boards, each board capable of operating in designate bands and at predetermined power levels.

These known solutions, however, have some drawbacks.

Particularly, in the case a reconfiguration is needed, a technician must actually get to the Remote Unit and insert the required and specific boards, thus increasing the cost to the network operator.

Furthermore, in order to allow the reconfiguration, the Remote Unit must be deployed in a location and setting that is accessible to the technician.

Furthermore, the Remote Unit must have rack infrastructure in order to accommodate the specific boards, increasing the size, weight, cost, and complexity of the Remote Unit.

DISCLOSURE OF THE INVENTION

The main aim of the present invention is to provide a reconfigurable radio remote unit for Distributed Antenna Systems that is configurable remotely, easily and with lower cost, without the need of a direct involvement of a technician on the site.

Another object of the present invention is to provide a reconfigurable radio remote unit for Distributed Antenna Systems that can be reconfigured without interruption of service.

Another object of the present invention is to provide a reconfigurable radio remote unit for Distributed Antenna Systems which allows much lower cost to the manufacturer.

The above-mentioned objects are achieved by the present reconfigurable radio remote unit for distributed antenna systems according to the features of claim 1.

BRIEF DESCRIPTION OF THE DRAWINGS

Other characteristics and advantages of the present invention will become better evident from the description of a preferred, but not exclusive, embodiment of a reconfigurable radio remote unit for distributed antenna systems, illustrated by way of an indicative but non-limiting example in the accompanying Figures, in which.

EMBODIMENTS OF THE INVENTION

With particular reference to such illustrations, globally indicated with reference 1 is a reconfigurable radio remote unit for distributed antenna systems.

The remote unit 1 can be used in conventional DAS systems and it has a fully integrated RF hardware with factory calibration information that is remotely reconfigurable, easily and without interruption of the service, by means of a dedicated management software.

Particularly, the reconfigurable radio remote unit 1 comprises a plurality of integrated radio frequency boards 2 each dedicated to a respective frequency band.

Figure 1:
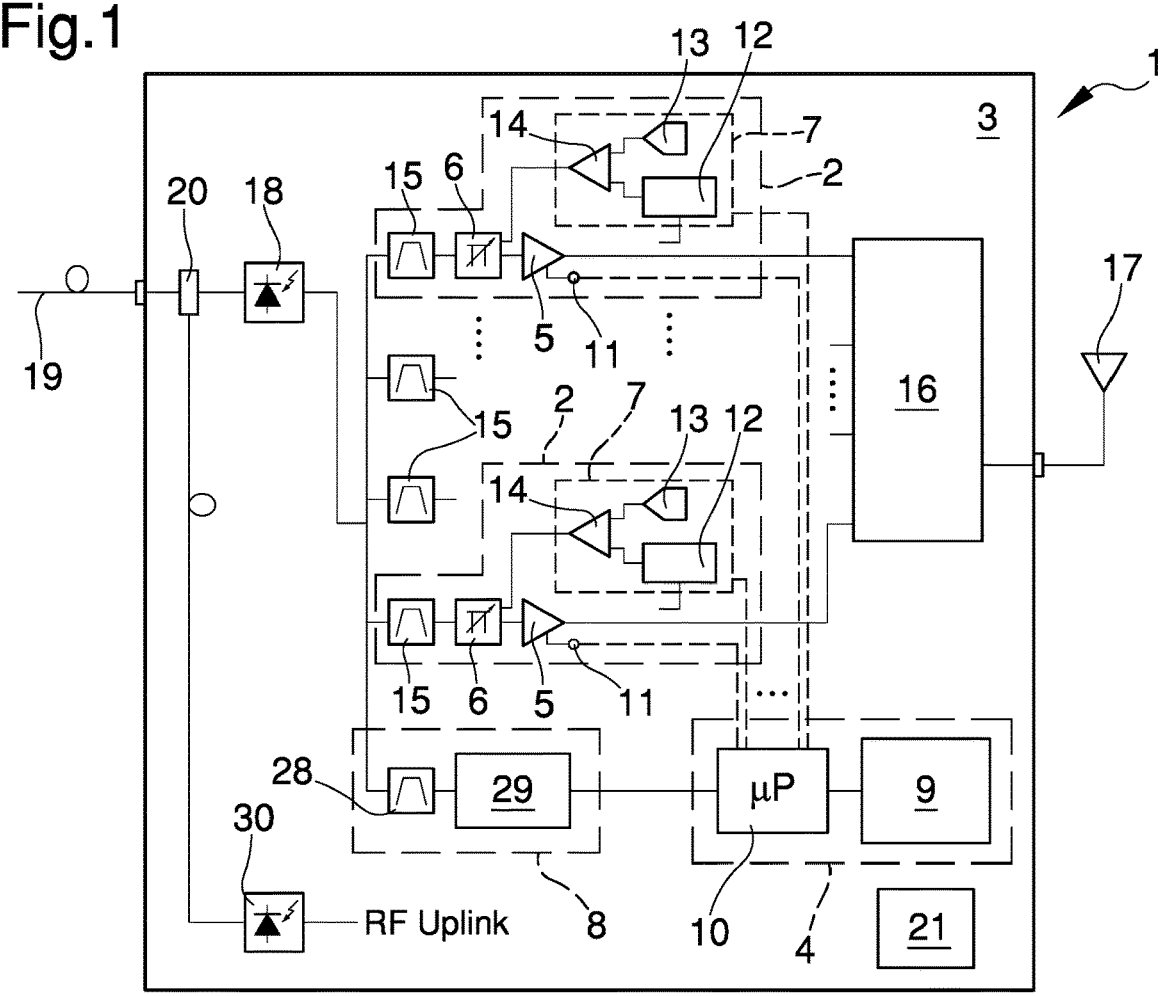
FIG. 1 shows an example of the remote unit according to the invention.

According to a preferred embodiment, schematically showed in FIG. 1, the reconfigurable radio remote unit 1 comprises a single main radio frequency board 3 provided with said plurality of integrated radio frequency boards 2 dedicated to respective frequency bands.

However, different embodiments are not excluded, in which for example different integrated boards are suitably made and connected to each other.

Furthermore, the reconfigurable radio remote unit 1 comprises configuration means 4, 5, 6, 7, 8 for remotely selecting one or more frequency bands and/or for setting the power level of said selected frequency bands.

Preferably, the configuration means 4, 5, 6, 7, 8 allow both the selection of one or more frequency bands and the setting of the power level for each selected frequency band.

Particularly, the configuration means 4, 5, 6, 7, 8 comprise a control unit 4 operatively connected with the plurality of integrated radio frequency boards 2.

The control unit 4 comprises at least a configuration table 9 containing a plurality of setting parameters for each available frequency band and for each available power level.

Particularly, according to a preferred embodiment of the reconfigurable radio remote unit 1, for each available frequency band and/or for each available power level the setting parameters in the configuration table 9 comprise:

Automatic Level Control parameters, Gain parameters, Current Threshold parameters.

Preferably, the setting parameters are stored in the configuration table 9 during the factory calibration of the reconfigurable remote unit 1.

Usefully, the control unit 4 can be provided with a memory unit for storing the configuration table 9.

Furthermore, the control unit 9 comprises at least a microprocessor 10.

Advantageously, the configuration means 4, 5, 6, 7, 8 comprise activation/deactivation means 5 operatively connected to the radio frequency boards 2 and configured for remotely activating or deactivating each of said radio frequency boards.

Furthermore, the configuration means 4, 5, 6, 7, 8 comprise power setting means 6, 7 operatively connected to the radio frequency boards 2 and configured for remotely setting the power level of each of said radio frequency boards.

Preferably, said power level is selected from a plurality of predefined power level values.

For example, the predefined power level could be selected from two predefined power levels, e.g. 31 dBm and 33 dBm.

However, different embodiments are not excluded, for example wherein the power level is selected from more than two predefined power levels and with different power level values.

Therefore, according to a possible embodiment, the reconfigurable radio remote unit 1 has a single integrated main radio frequency board 3 that has individual radio frequency boards 2 for each band that the remote unit is capable of operating.

Each individual radio frequency boards 2 integrated within the reconfigurable radio remote unit 1 can be remotely activated, and its power level can be individually set to one of a plurality of predefined power levels.

Corresponding calibration parameters are stored during the factory tuning of the reconfigurable radio remote unit 1 for each predefined power level and for each frequency band.

The reconfigurable remote unit 1 circuitry is designed in order to handle the max selectable RF power level.

Each reconfigurable radio remote unit 1 can be deployed in its default mode, corresponding to a specific active band (e.g., AWS) and to a predefined starting power level (e.g., 31 dBm).

Once deployed, an operator can activate additional bands on the reconfigurable radio remote unit 1 and/or increase/decrease the band power level, to meet the needs of the network.

With particular reference to the preferred embodiment of the reconfigurable radio remote unit 1 showed in the Figures, for each of the integrated radio frequency boards 2, the activation/deactivation means 5 are implemented by a power amplifier with an enabling/disabling port 11. The enabling/disabling port 11 is operatively connected with the control unit 4.

Different embodiments of the activation/deactivation means 5 are not excluded.

Furthermore, with particular reference to the preferred embodiment of the reconfigurable radio remote unit 1 showed in the Figures, for each of the integrated radio frequency boards 2, the power setting means 6, 7 are implemented by at least an attenuation circuit operatively connected with the control unit 4.

Particularly, for each integrated radio frequency board 2, the attenuation circuit 6, 7 comprises at least a digital attenuator 6 and an Automatic Level Control (ALC) circuit 7 operatively connected with the digital attenuator 6.

According to a preferred embodiment, the ALC circuit 7 comprises a RMS power detector 12 for detecting the current/voltage at the output of the power amplifier 5, a D/A converter 13 for converting a current/voltage threshold value, and a comparator 14 for comparing the detected current/voltage with the current/voltage threshold value. The comparator 14 is operatively connected with the attenuator 6.

Each of the integrated radio frequency boards 2 comprises at least a band-pass filter 15 for passing a respective and predefined frequency band.

With reference to the preferred embodiment, on the downlink path the band-pass filter 15 is positioned upstream of the digital attenuator 6.

Furthermore, on the downlink path, the digital attenuator 6 is positioned upstream of the power amplifier 5.

The reconfigurable remote unit 1 further comprises at least a combiner 16 connected to the output of each of the integrated radio frequency boards 2 and connected to at least an antenna 17. The combiner combines each frequency band related to each of the active radio frequency boards 2.

Particularly, the combiner 16 is connected to the output of the power amplifiers 5 of each of the integrated radio frequency boards 2.

Furthermore, it is pointed out that the combiner 16 as well as other blocks of the main board (amplifiers, filters, etc.) can be implemented on further integrated boards operatively connected to the main radio frequency board 3. For example, in a possible embodiment concerning a high power remote unit each amplifier preferably has its own board.

The reconfigurable remote unit 1 comprises at least a first electro-optical converter 18 for converting the optical signal coming from an optical fiber 19 connected to the input of the reconfigurable remote unit itself into an electrical signal to be sent to the radio frequency boards 2 on the RF downlink path.

Furthermore, the reconfigurable remote unit 1 comprises at least a second electro-optical converter 30 for converting the electrical signal coming from the antenna 18 through the RF uplink path into an optical signal to be sent to the optical fiber 19.

Advantageously, the configuration means 4, 5, 6, 7, 8 comprises at least a control data detecting unit 8 operatively connected with the electro-optical converter 18, the radio frequency boards 2 and the control unit 4. The detecting unit 8 check and send received control data to the control unit 4.

According to a preferred embodiment of the reconfigurable remote unit 1, the detecting unit 8 comprises a control data filter 28 for filtering the control data from the input signal.

The control data filter 28 is operatively associated to the control unit 4.

Furthermore, as showed in FIG. 1, the detecting unit 8 can comprise a modem 29, operatively interposed between the control data filter 28 and the control unit 4, suitable for transmitting/receiving said control data and other data to/from a remote management unit 26.

Particularly, the modem 29 could be used to remotely check and control the functioning of the reconfigurable remote unit 1.

The reconfigurable remote unit 1 further comprises a splitter 20 for splitting between the uplink path and the downlink path.

For example, the splitter 20 can be implemented by a dedicated WDM (Wavelength Division Multiplexing) module.

It is noted that only the downlink path of the reconfigurable remote unit 1 is schematically shown in the figures and detailed in the present description. The uplink path may be implemented in a conventional manner, using solutions and techniques known to the skilled person. Usefully, the reconfigurable remote unit 1 comprises a power supply circuit 21 for supplying the needed power to the circuitry of the remote unit itself.

Figure 2:
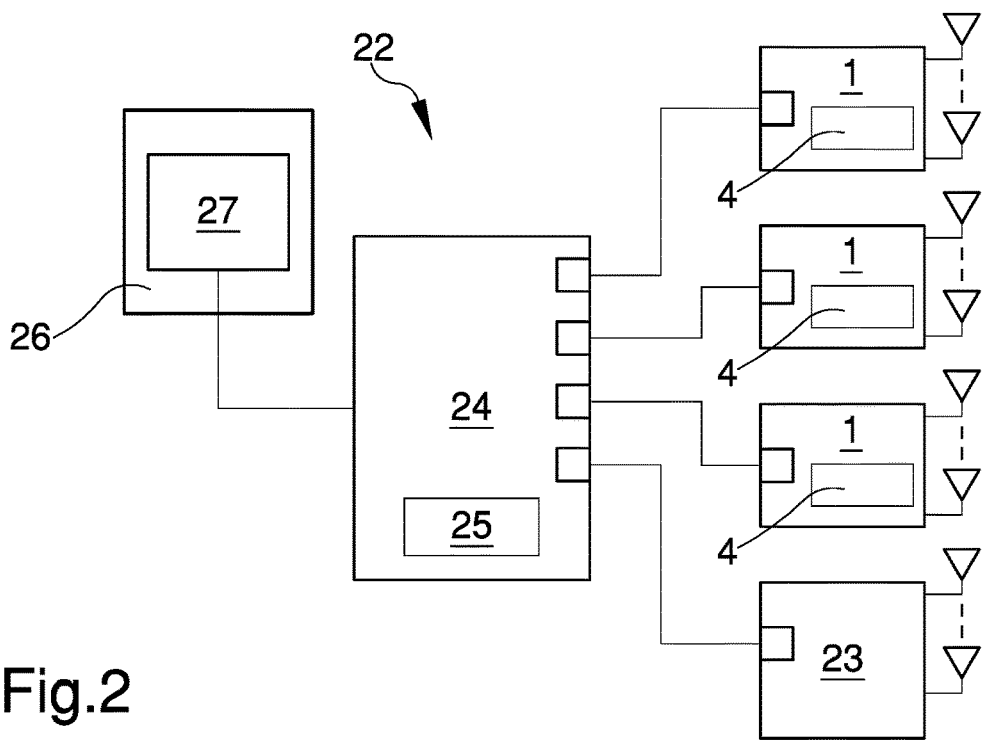
FIG. 2 shows an example of a reconfigurable DAS system with a plurality of remote units according to the invention.

FIG. 2 shows an example of reconfigurable distributed antenna system 22 with a plurality of reconfigurable remote units 1 according to the invention, in addition to an exemplary high power unit 23.

Particularly, the reconfigurable distributed antenna system 22 comprises a plurality of reconfigurable radio remote units 1 and at least a master unit 24 operatively connected to said reconfigurable radio remote units 1.

The master unit 24 comprises a supervision unit 25 operatively connected with the control unit 4 of each of the reconfigurable radio remote units 1.

Particularly, the supervision unit 25 can manage all the parameters concerning the functioning of each of the connected reconfigurable remote units 1 (alarms, attenuation, monitoring, etc.).

Furthermore, the reconfigurable distributed antenna system 22 could comprise at least a management unit 26 that interfaces with the supervision unit 25 to access and set the configuration of each of the reconfigurable remote units 1 and 23.

Preferably, the management unit 26 is provided with an Operations and Maintenance Centre (OMC) unit 27 operatively connected with the supervision unit 25 and configured for accessing and setting the reconfigurable radio remote unit 1.

For example, the management unit 26 can be constituted by at least a personal computer and/or server and the OMC unit 27 can be implemented by dedicated OMC software installed on said computer/server.

For example, by means of the remote unit 26 and related OMC software 27 it is possible to license specific configured bands and power levels to a specific network operator.

Therefore, the OMC software 27 could be used to remotely control the DAS system 22 (and then to remotely upgrade each reconfigurable remote unit 1). However, the OMC software 27 is not necessary.

In fact, the supervision unit 25 on the master unit 24 can comprise an integrated OMT (Operation and Maintenance Terminal) unit used to manage a particular DAS system.

Therefore, the OMT unit on the supervision unit 25 by itself (that for example can be used remotely through web pages) can be sufficient to configure from a remote location the reconfigurable remote units 1 and 23.

In a preferred embodiment, the reconfigurable distributed antenna system 22 uses an authentication procedure for verifying if the OMC software 27 (or other software) and/or the OMT unit in the supervision unit 25 is authorized to check and/or modify the frequency band configuration and/or power level configuration of a reconfigurable remote unit 1 or 23.

According to a possible embodiment, the authentication procedure uses an encrypted form of serial numbers univocally assigned to corresponding reconfigurable remote units 1 to enable the OMC software 27 or the OMT unit on the supervision unit 25 to access and configure the radio frequency boards 2 for the licensed bands and power levels.

According to a preferred embodiment, an hash function is used for generating a unique key using as input parameters the serial number of the reconfigurable remote unit 1 and status flags, intended as power levels and frequency band enabling.

To unlock specific features of a reconfigurable remote unit 1, the customer asks for a license and a unique key by means of the hash function.

Afterwards, the unique key is inserted in the management OMC software 27 or in the OMT unit and then sent to the control unit 4 of the reconfigurable remote unit 1 together with the status flags.

Inside the control unit 4 it is hard coded the proprietary hash function so that using its own serial number and the received status flags the reconfigurable remote unit 1 is able to locally generate the unique key and compare the generated unique key with the received unique key, in order to verify that the received unique key is valid.

If this process is successful, then the control unit 4 of the reconfigurable remote unit 1 applies the desired configuration (upgrade) on-the-fly without any service interruption.

However, different embodiments of the authentication procedure are not excluded.

In practice it has been observed that the described invention achieves the intended purposes.

Particularly, there is no need for a technician to insert a board into the remote unit and the individual boards and power levels are set remotely and on-the-fly, without any service interruption.

Therefore, the network operator can remotely deploy and adjust the network to meet its needs much more easily and with lower cost.

The remote unit according to the invention allows much lower cost to the manufacturer because there is only one model of RU, instead of the need to manufacture/sell/support multiple individual swappable boards.

Furthermore, the remote unit can be smaller and lighter because it need not support swappable boards. Particularly, power and band upgrade can be performed without adding any additional weight to the remote unit.

Furthermore, the reconfigurable remote unit according to the invention has enhanced enclosure capabilities, allowing a higher level of protection from water, dust, oil, and other non-corrosive material.

In addition, the reconfigurable remote unite according to the invention enhances the energy efficiency.

Last but not least, the remote unit according to the invention allows to make more on the backend by licensing capability instead of selling specific hardware.

The invention claimed is:

1. A reconfigurable radio remote unit for distributed antenna systems, comprising:
 a plurality of integrated radio frequency boards each dedicated to a respective frequency band, and
 configuration means for remotely selecting said frequency bands and/or for setting the power level of said frequency bands, wherein said configuration means comprise:
 activation/deactivation means operatively connected to said radio frequency boards and configured for remotely activating or deactivating each of said radio frequency boards; and
 power setting means operatively connected to said radio frequency boards and configured for remotely setting the power level of each of said radio frequency boards.

2. The reconfigurable radio remote unit according to claim 1, wherein said power level is selected from a plurality of predefined power levels.

3. The reconfigurable radio remote unit according to claim 1, wherein said configuration means comprises at least a control unit operatively connected with said plurality of integrated radio frequency boards.

4. The reconfigurable radio remote unit according to claim 3, wherein said control unit comprises at least a configuration table containing a plurality of setting parameters for each available frequency band and/or for each available power level.

5. The reconfigurable radio remote unit according to claim 4, wherein, for each available frequency band and/or for each available power level, said setting parameters comprise: Automatic Level Control parameters, Gain parameters, Current Threshold parameters.

6. The reconfigurable radio remote unit according to claim 3, wherein said control unit comprises at least a microprocessor.

7. A reconfigurable distributed antenna system, comprising at least a reconfigurable radio remote unit according to claim 3 and at least a master unit, wherein said master unit comprises at least a supervision module operatively connected with said control unit of said at least a reconfigurable radio remote unit.

8. The reconfigurable distributed antenna system according to claim 7, wherein said supervision unit comprises an integrated OMT (Operation and Maintenance Terminal) unit configured for accessing and setting said at least a reconfigurable radio remote unit.

9. The reconfigurable distributed antenna system according to claim 7, wherein it comprises at least a management unit provided with at least an OMC (Operation and Maintenance Centre) software operatively connected with said at least a supervision unit and configured for accessing and setting said at least a reconfigurable radio remote unit.

10. The reconfigurable radio remote unit according to claim 1, wherein said configuration means comprises at least a control unit operatively connected with said plurality of integrated radio frequency boards and wherein, for each of said integrated radio frequency boards, said activation/deactivation means comprise at least a power amplifier with an enabling/disabling port, wherein said enabling/disabling port is operatively connected with said control unit.

11. The reconfigurable radio remote unit according to claim 1, wherein said configuration means comprises at least a control unit operatively connected with said plurality of integrated radio frequency boards and wherein, for each of said integrated radio frequency boards, said power setting means comprise at least an attenuation circuit operatively connected with said control unit.

12. The reconfigurable radio remote unit according to claim 11, wherein, for each of said integrated radio frequency boards, said attenuation circuit comprises at least a digital attenuator and an Automatic Level Control circuit operatively connected with said digital attenuator.

13. The reconfigurable radio remote unit according to claim 1, wherein each of said integrated radio frequency boards comprises at least a band-pass filter for passing a respective and predefined frequency band.

14. The reconfigurable radio remote unit according to claim 1, comprising a single main radio frequency board provided with said plurality of integrated radio frequency boards dedicated to respective frequency bands.

15. The reconfigurable distributed antenna system according to claim 9, wherein it uses an authentication procedure for verifying if the OMC software is authorized to check and/or modify the frequency band configuration and/or power level configuration of said at least a reconfigurable remote unit.

16. The reconfigurable distributed antenna system according to claim 8, wherein it uses an authentication procedure for verifying if the OMT unit is authorized to check and/or modify the frequency band configuration and/or power level configuration of said at least a reconfigurable remote unit.

* * * * *